(No Model.)

R. C. MOORE.
FILTER

No. 313,946. Patented Mar. 17, 1885.

WITNESSES
Edw. G. Siggers.
W. L. Harris

Robert C. Moore
INVENTOR by C. A. Snow & Co.
Attorneys

UNITED STATES PATENT OFFICE.

ROBERT C. MOORE, OF HOLTON, KANSAS.

FILTER.

SPECIFICATION forming part of Letters Patent No. 313,946, dated March 17, 1885.

Application filed May 20, 1884. (No model.)

*To all whom it may concern:*

Be it known that I, ROBERT C. MOORE, a citizen of the United States, residing at Holton, in the county of Jackson and State of Kansas, have invented a new and useful Filter, of which the following is a specification, reference being had to the accompanying drawings.

This invention has relation to filters for water and other liquids; and it consists in the construction and novel arrangement of parts, as will be hereinafter fully described, and particularly pointed out in the claims.

Figure 1:
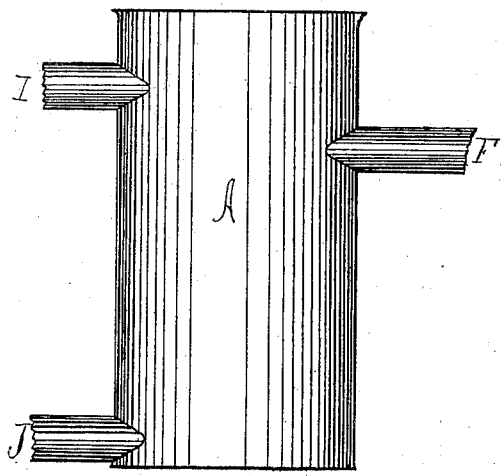
Figure 3:
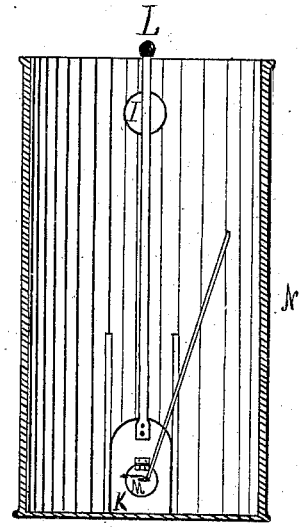
Figure 2:
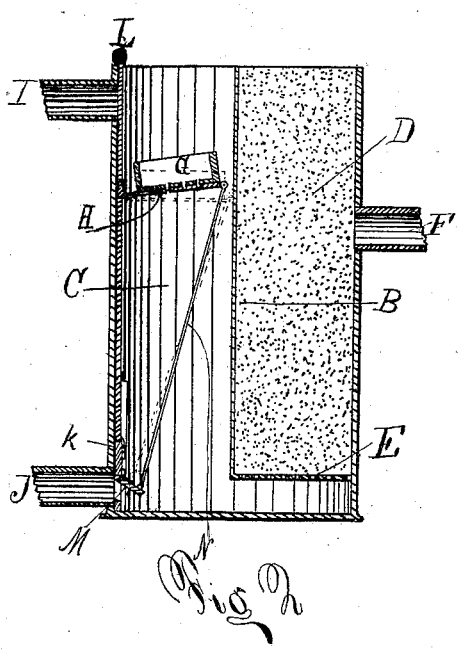
Figure 4:
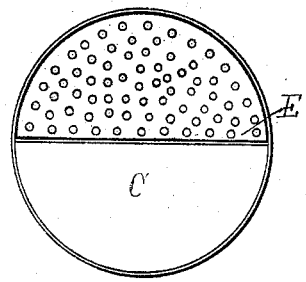

Figure 1 is a view in perspective of a filter embodying my improvements. Fig. 2 is a vertical sectional view, and Fig. 3 is a vertical sectional view showing a face view of the valve for the outlet-pipe at the bottom of the tank. Fig. 4 is a plan view.

Referring by letter to the accompanying drawings, A designates the tank, which is separated by a partition, B, into a water-chamber and a filtering-chamber, (designated, respectively, by C and D.) The filtering-chamber D is provided with a perforated bottom, E, which is a short distance above the bottom of the tank. The filtering-chamber is partly filled with charcoal, sand, or other suitable filtering material, and is provided with an outlet-pipe, F, which is a little below the level of the filling-pan G in the water-chamber C. The water-chamber C is provided with a filling pan or basin, G, which rests on spring-arms H H, secured to one side of said chamber, as shown, which receives the water from the inlet-pipe I. The waste-pipe J is provided with a sliding valve, K, which is operated by a rod, L, extending through the cover of the tank to open and close it without removing the cover of the tank. This sliding valve is provided with a smaller lift-valve, M, hinged thereto and connected by a chain or wire, N, to the ends of the spring-arms H H. The basin has a small outlet in the bottom through which the water flows to the water-chamber. The water from the water-chamber rises up through the perforated bottom of the filtering-chamber and passes out at the outlet-pipe. When the water from the inlet-pipe flows into the filling-basin, the weight of the water presses the spring-arms H H down, thereby closing the lift-valve M. When the water ceases to flow from the inlet-pipe, the pan empties its contents through the small hole in its bottom, and as the pan becomes lighter the springs rise and open the lift-valve and let the water out through the waste-pipe, thereby preventing the filter from freezing. In the summer season this automatic valve is not necessary. When the filling-pan is full, and it is desired to open the slide-valve K, it may be done by raising the rod L, and the water will escape rapidly through the waste-pipe.

It will be noticed that the water is forced up through the filtering material, instead of down through it, as is commonly the case in filters now in use.

I would have it understood that I am aware of the patent to Clarke, No. 13,826, dated June 12, 1855, and do not claim the construction therein shown.

Having thus fully described my invention, what I claim as new, and desire to secure by Letters Patent of the United States, is—

1. The combination, with the tank A, provided with the water-chamber C, extending from top to bottom at one side, and provided with the inlet-pipe I at its upper end, and outlet-pipe J on the same side at its lower end, of the valve M, spring-arms H H, sliding valve K, and the filling-pan G, substantially as specified.

2. The combination, with the tank having the water-chamber C, extending from its top to its bottom on one side, and provided with the inlet-pipe I at its upper end, and the outlet-pipe J on the same side at its lower end, of the filter-chamber D, having the perforated bottom E and outlet F, and the perforated filling-pan G, the spring-arms H H, the connecting-rod connecting the spring-arms, and lifting-valve, substantially as specified.

In testimony that I claim the foregoing as my own I have hereto affixed my signature in presence of two witnesses.

ROBERT C. MOORE.

Witnesses:
J. A. SCOTT.
W. H. WEBSTER.